(12) United States Patent
Yokoi

(10) Patent No.: US 8,306,371 B2
(45) Date of Patent: Nov. 6, 2012

(54) METHOD FOR MANUFACTURING OPTICAL NONRECIPROCAL ELEMENT, AND OPTICAL NONRECIPROCAL ELEMENT

(75) Inventor: Hideki Yokoi, Tokyo (JP)

(73) Assignee: Shibaura Institute of Technology, Tokyo (JP)

( * ) Notice: Subject to any disclaimer, the term of this patent is extended or adjusted under 35 U.S.C. 154(b) by 0 days.

(21) Appl. No.: 12/665,435

(22) PCT Filed: Aug. 27, 2008

(86) PCT No.: PCT/JP2008/065331
§ 371 (c)(1),
(2), (4) Date: Apr. 5, 2010

(87) PCT Pub. No.: WO2010/023738
PCT Pub. Date: Mar. 4, 2010

(65) Prior Publication Data
US 2011/0158578 A1    Jun. 30, 2011

(51) Int. Cl.
*G02F 1/295* (2006.01)
(52) U.S. Cl. .......................................................... 385/6
(58) Field of Classification Search .................. 385/6
See application file for complete search history.

(56) References Cited

U.S. PATENT DOCUMENTS

| 6,943,932 | B2 | 9/2005 | Fujita et al. | |
|---|---|---|---|---|
| 7,826,690 | B2 * | 11/2010 | Nakajima et al. | 385/6 |
| 7,995,893 | B2 * | 8/2011 | Bi et al. | 385/131 |

FOREIGN PATENT DOCUMENTS

| JP | 07-043654 | 2/1995 |
|---|---|---|
| JP | 07-318876 | 12/1995 |
| JP | 08-068965 | 3/1996 |
| JP | 2000-338450 | 12/2000 |
| JP | 2001-350039 | 12/2001 |
| JP | 2003-302603 | 10/2003 |
| JP | 2004-240003 | 8/2004 |
| JP | 2006-349778 | 12/2006 |
| JP | 2007-219285 | 8/2007 |
| WO | WO-2007/094515 | 8/2007 |

OTHER PUBLICATIONS

Japanese Inquiry issued for Japanese Patent Appl. No. 2009-529451 mailed Feb. 16, 2011 (English translation not available).
Shintaku, T., "Integrated Optical Isolator Based on Efficient Nonreciprocal Radiation Mode Conversion," Applied Physics Letters, Oct. 5, 1998, vol. 73, No. 14, pp. 1946-1948.
U.S. Appl. No. 12/665,635, filed Dec. 18, 2009, Yokoi.
Shintaku, T. et al., "Directional Coupler Type Optical Circulator," *Transactions of the IEICE*, vol. E73, No. 4, Apr. 1990, pp. 474-476.

(Continued)

*Primary Examiner* — Sung Pak
(74) *Attorney, Agent, or Firm* — Foley & Lardner LLP

(57) ABSTRACT

A novel technique is provided, which can manufacture an optical nonreciprocal element constituted of an Si waveguide layer and a magneto-optical material layer without using wafer bonding. A magneto-optical material layer is deposited on a substrate, an Si layer is deposited on the aforesaid magneto-optical material layer, a waveguide is formed on the aforesaid Si layer, and the aforesaid magneto-optical material layer is magnetized so as to be able to cause a light propagating in the aforesaid waveguide to generate a nonreciprocal phase change.

4 Claims, 7 Drawing Sheets

OTHER PUBLICATIONS

Yokoi, H. et al., "Magnetooptic Waveguide with $SiO_2$ Cladding Layer Integrated on InP Substrate by Wafer Direct Bonding," *Jpn. J. Appl. Phys.*, vol. 36, 1997, pp. 7230-7232.

Yokoi, H. et al., "Optical nonreciprocal devices with a silicon guiding layer fabricated by wafer bonding," *Applied Optics*, vol. 42, No. 33, Nov. 20, 2003, pp. 6605-6612.

Yokoi, H. et al., "Optical nonreciprocal devices with Si guiding layer," *Technical Report of IEICE*, vol. 103, No. 667, Feb. 2004, pp. 17-22 (with English abstract).

Yokoi, H. et al., "Analysis of the effect of nonreciprocal phase shift on magneto-optical waveguide having Si guiding layer," *Proceedings of the 2005 IEICE Society Conference*, Sep. 20, 2005, pp. 216 (with English translation).

Zhuang, X. et al., "An Analysis of Nonreciprocal Phase Characteristics of Magneto-Optic Channel Waveguides Using Finite-Element Method," *Technical Report of Institute of Electronics, Information, and Communication Engineers*, vol. J76-C-I, No. 2, Feb. 1993, pp. 41-47 (with English translation).

Notice of Reasons for Rejection for JP 2009-529451 mailed Jan. 5, 2010 (with English translation).

International Search Report for PCT/JP2008/065331 mailed Sep. 30, 2008 (with English translation).

International Search Report for PCT/JP2008/053214 mailed Mar. 25, 2008 (with English translation).

Yokoi, H. et al., "Calculation of Nonreciprocal Phase Shift in Magnetooptic Waveguide with Si Guiding Layer," Japanese Journal of Applied Physics, vol. 43, No. 8B, 2004, pp. 5871-5874.

Decision of Rejection for JP 2009-529451 mailed Apr. 14, 2010 (with English translation).

Yokoi, H. et al., "Optical nonreciprocal devices with Si guiding layer," Technical Report of IEICE, vol. 103, No. 667, Feb. 2004, pp. 17-22 (with full English translation—*previously submitted with English abstract only*).

Notice of Reasons for Rejection for JP 2009-529454 mailed Oct. 5, 2009 (with English translation).

Notice of Reasons for Rejection for JP 2009-529451 mailed Oct. 14, 2009 (with English translation).

Amemiya T. et al., "Semiconductor waveguide optical isolator based on nonreciprocal loss induced by ferromagnetic MnAs," *Applied Physics Letters*, 2006, vol. 89, Issue 2, 3 pages.

International Preliminary Report on Patentability for Intl. Pat. Appln. No. PCT/JP2008/053214 (including English translation), issued on Aug. 31, 2010, 11 pages.

International Preliminary Report on Patentability for Intl. Pat. Appln. No. PCT/JP2008/065331 (including English translation), issued on Mar. 1, 2011, 8 pages.

Written Opinion of the International Searching Authority for Intl. Pat. Appln. No. PCT/JP2008/053214 (including English translation), mailed on Mar. 25, 2008, 9 pp.

Written Opinion of the International Searching Authority for Intl. Pat. Appln. No. PCT/JP2008/065331 (including English translation), mailed on Sep. 30, 2008, 6 pages.

Yokoi, H., "Interferometric Optical Isolator with $TiO_2$/Magnetic Garnet Waveguide Operated in Unidirectional Magnetic Field," *Japanese Journal of Applied Physics*, 2006, vol. 45, No. 6A, pp. 5076-5077.

Non-final Office Action received for U.S. Appl. No. 12/665,635 dated Feb. 23, 2012.

\* cited by examiner

METHOD FOR MANUFACTURING OPTICAL NONRECIPROCAL ELEMENT, AND OPTICAL NONRECIPROCAL ELEMENT

CROSS-REFERENCE TO RELATED APPLICATIONS

The present application is a U.S. national stage application claiming the benefit of International Application No. PCT/JP2008/065331, filed on Aug. 27, 2008, the entire contents of which is incorporated herein by reference in its entirety.

TECHNICAL FIELD

The present embodiment relates to an optical nonreciprocal element, and a method for manufacturing the same.

BACKGROUND ART

There is provided a method for manufacturing a compact optical nonreciprocal element by forming a waveguide on an Si layer of an SOI substrate, and bonding a magneto-optical material layer, which causes a light propagating in the waveguide to generate a nonreciprocal phase change, onto the Si layer. For example, Non-Patent Document 1 discloses a method for manufacturing an optical nonreciprocal element by bonding magnetic garnet by direct bonding (wafer bonding) onto an Si waveguide layer on which a rib waveguide is formed.

[Non-Patent Document 1] Hideki Yokoi and two others, "Si Dohaso o Yusuru Hi Sohan Soshi", IEICE Technical Report, February 2004, Vol. 103, No. 667 (20040213), pp. 17-22

DISCLOSURE OF THE INVENTION

Problems to be Solved by the Invention

Wafer bonding usually forms hetero junction by application of heat treatment (for example, 800° C. to 900° C.) to a bonded substrate surface, and has the problem that shrinkage occurs to a substrate by being cooled after the heat treatment, and a crack easily occurs.

Against such a problem, a countermeasure is conceivable, which suppresses the occurrence of a crack by lowering the temperature at the time of heat treatment (for example, lowering the temperature to 220° C.). However, when a magneto-optical material layer is bonded onto the Si layer on which a waveguide with recesses and projections is formed by wafer bonding, as the optical nonreciprocal element of Non-Patent Document 1, it is difficult to achieve sufficient adhesion at a low temperature, unlike the case of bonding flat materials by wafer bonding.

Thus, it is desired to provide a novel technique capable of manufacturing an optical nonreciprocal element constituted of an Si waveguide layer and a magneto-optical material layer without using wafer bonding.

Means for Solving the Problems

A method for manufacturing an optical nonreciprocal element of the present embodiment includes the steps of depositing a magneto-optical material layer on a substrate, depositing an Si layer on the aforesaid magneto-optical material layer, forming a waveguide on the aforesaid Si layer, and magnetizing the aforesaid magneto-optical material layer so as to be able to cause a light propagating in the aforesaid waveguide to generate a nonreciprocal phase change.

The step of magnetizing the aforesaid magneto-optical material layer can be made the step of magnetizing the aforesaid magneto-optical material layer in a direction vertical to a propagating direction of the light in the aforesaid waveguide.

The aforesaid magneto-optical material layer can be formed by magnetic garnet formed by growing a crystal on the aforesaid substrate.

An optical nonreciprocal element of the present embodiment includes an Si waveguide layer on which a waveguide is formed, and a magneto-optical material layer which is in contact with a surface at a side opposite from a surface on which the aforesaid waveguide is formed, of the aforesaid Si waveguide layer, the aforesaid Si waveguide layer is obtained by forming a waveguide on an Si layer deposited on the aforesaid magneto-optical material layer, and the aforesaid magneto-optical material layer is magnetized so as to cause a light propagating in said waveguide to generate a nonreciprocal phase change.

Advantage of the Invention

As above, according to the present embodiment, an optical nonreciprocal element constituted of an Si waveguide layer and a magneto-optical material layer can be manufactured without using wafer bonding.

BEST MODE FOR CARRYING OUT THE INVENTION

Hereinafter, the present embodiment will be described with reference to the drawings.

FIG. 1 is a view showing the present embodiment, and shows a structure of an optical isolator using an optical nonreciprocal phase shift effect. FIG. 2 is a view showing a structure when cut along the A-A' line of FIG. 1.

As shown in FIGS. 1 and 2, an optical isolator 100 includes an Si waveguide layer 1 on which a rib waveguide 3 is formed, and a magneto-optical material layer 2 which is in contact with a surface at a side opposite from a surface on which the rib waveguide 3 is formed, of the Si waveguide layer 1.

The Si waveguide layer 1 is obtained by forming the rib waveguide 3 after depositing an Si layer (thickness of about 200 nm) on the magneto-optical material layer 2, as will be described later.

As the magneto-optical material layer 2, a layer formed by growing a crystal of a magneto-optical material on a proper substrate 4 can be used.

The magneto-optical material layer 2 is magnetized in the vertical direction to the propagating direction of the light in the rib waveguide 3 within the film surface so as to cause the light propagating in the rib waveguide 3 to cause a nonreciprocal phase change. In the present embodiment, the magneto-optical material layer 2 is magnetized so that the directions of magnetization are in the opposite directions in the portions corresponding to two waveguides (waveguides 21 and 22 of FIG. 3), and for this purpose, magnetic field applying unit 5 (a pair of compact permanent magnets or the like), which applies a magnetic field, is provided in the vicinity of the magneto-optical material layer 2 (see FIG. 2).

Next, with reference to FIG. 3 schematically showing the rib waveguide 3, the operation principle of the optical isolator 100 of the present embodiment will be described.

The optical isolator 100 is configured by a Mach-Zender interferometer which multiplexes and demultiplexes waves by two tapering trifurcated optical couplers, has two waveguides 21 and 22 between the two tapering trifurcated optical couplers, and includes a reciprocal phase shifter of 90° and a nonreciprocal phase shifter of 90°. The tapering trifurcated optical coupler may be an optical branching/coupling device which is a so-called Y branch.

The nonreciprocal phase shifter is realized by a layer structure of an upper clad (air in the present embodiment)/Si/magneto-optical material. In such a structure, magnetization of the magneto-optical material layer 2 is oriented within the film surface and vertically to the propagating direction of a light, whereby a nonreciprocal phase shift effect occurs to a propagating TM mode light.

The nonreciprocal phase shifter is designed so that the difference of nonreciprocal phase changes in the two waveguides 21 and 22 in the interferometer becomes 90° in the forward direction (−90° in the reverse direction). Such a design can be realized by adjusting the refractive indexes of the Si waveguide layer 1 and the magneto-optical material layer 2, the direction of magnetization applied to each of the waveguides, propagation length in which the light wave receives the magneto-optical effect and the like.

Meanwhile, the reciprocal phase shifter is realized by the optical path difference of the two waveguides in the interferometer, and is designed so that the difference of reciprocal phase changes in the two waveguides 21 and 22 in the interferometer becomes −90°.

The TM mode light which is incident on a port 11 is branched into light waves of the same amplitude and the same phase by the tapering trifurcated optical coupler at the input end side, and the respective light waves propagate in the forward direction in the waveguides 21 and 22 respectively. The difference of the phase changes of 90° occurs to the light waves which propagate in the forward direction in the waveguide 21 and the waveguide 22 due to the nonreciprocal phase shift effect, but such a difference is cancelled out by the reciprocal phase shift effect of the same amount. As a result, the light waves propagating in the forward direction in the waveguides 21 and 22 are incident on the tapering trifurcated optical coupler at the output end side with the same amplitude and the same phase, and are coupled to a port 12 and is outputted.

Meanwhile, the TM mode light incident on the port 12 is branched into the light waves of the same amplitude and the same phase by the tapering trifurcated optical coupler at the output end side, and each of the light waves propagates in the reverse direction in the waveguide 21 and the waveguide 22. The difference of the phase changes of −90° occurs to the light waves which propagate in the reverse direction in the waveguide 21 and the waveguide 22 by the nonreciprocal phase shift effect, and further, the difference of the phase changes of −90° by the reciprocal phase shift effect is added. As a result, the light waves propagating in the reverse direction in the waveguide 21 and waveguide 22 are incident on the tapering trifurcated optical coupler at the input end side with the same amplitude and a phase difference of 180°. In this case, due to the characteristics which the tapering trifurcated optical coupler has, each of the light waves is coupled to ports 13 and 14 instead of the port 11, and is outputted.

As above, the TM mode light which enters from the port 11 is outputted from the port 12, but the TM mode light which enters from the port 12 is not outputted from the port 11, and therefore, an isolator operation is obtained between the port 11 and the port 12.

Next, a manufacturing process for obtaining the structure as shown in FIGS. 1 and 2 will be described with reference to FIGS. 4A to 4D.

Next, the magneto-optical material layer 2 is deposited on the substrate 4 corresponding to the magneto-optical material by crystal growth (FIG. 4A). For example, when a rare-earth magnetic garnet (hereinafter, called "magnetic garnet") which is expressed by a composition formula of $R_3Fe_5O_{12}$ (R represents a rare earth element) is used as the magneto-optical material, a magnetic garnet layer 2 can be deposited on the single crystal substrate 4 constituted of garnet by liquid phase epitaxy.

Next, an Si layer is deposited on the magneto-optical material layer 2 by depositing Si (FIG. 4B). As the depositing method, the conventional thin-film forming techniques such as spin coat, spraying and sputtering can be used.

Next, a waveguide pattern is transferred onto the Si layer by photolithography, the rib waveguide 3 is formed by etching, and the Si waveguide layer 1 is formed (FIG. 4C). For photolithography and etching, various prior arts can be used.

In accordance with necessity, a flattening step may be provided after depositing the magneto-optical material layer 2 and the Si layer.

Next, the magneto-optical material layer 2 is magnetized so as to cause the light propagating in the rib waveguide 3 to generate a nonreciprocal phase change (FIG. 4D). As the method for magnetization, various prior arts can be used, and in the present embodiment, as shown in FIG. 2, magnetic field applying unit 5 (a pair of compact permanent magnets or the like) which applies a magnetic field from outside in order to align the direction of magnetization of the magneto-optical material layer 2 with the direction vertical to the propagating direction of light is provided in the vicinity of the magneto-optical material layer 2.

Magnetization of the magneto-optical material layer 2 may be performed after deposition of the magneto-optical material layer 2 before deposition of the Si layer.

FIG. 5 shows the calculation result of a nonreciprocal phase shift effect (Nonreciprocal phase shift) in the case of configuring the optical isolator 100 by the layer structure of air/Si/Ce:YIG by using Ce substituted yttrium iron garnet (Ce:YIG) as the magneto-optical material layer. This calculation is on the precondition that the thickness of the Ce:YIG layer is infinitive (namely, the light waves do not receive the influence of the garnet substrate). This diagram shows that when the thickness of the Si layer (Si thickness) is about 200 nm, the nonreciprocal phase shift effect becomes the maximum, and the element length (required light propagation distance: Required propagation distance) becomes the minimum.

FIG. 6 shows the result of calculating how the nonreciprocal phase shift effect changes in accordance with the thickness of Ce:YIG layer (Ce:YIG thickness) when the thickness of the Si layer is set at 200 nm, 300 nm and 400 nm in the optical isolator 100 of the layer structure of air/Si/Ce:YIG/garnet. This diagram shows that when the thickness of the Ce:YIG layer is larger than about 300 nm, the amount of the nonreciprocal phase shift effect becomes constant. Accordingly, if the Ce:YIG layer is deposited to about 300 nm on the garnet substrate, a stable nonreciprocal phase shift effect can be obtained.

According to the present embodiment, the Si layer is deposited on the magneto-optical material layer 2, the rib waveguide 3 is formed on such a Si layer, and the Si waveguide layer 1 is formed. Therefore, the optical isolator 100 configured by the Si waveguide layer 1 and the magneto-optical material layer 2 can be manufactured without using wafer bonding. Further, since the Si layer is directly deposited on the magneto-optical material layer 2, high adhesion between the Si waveguide layer 1 and the magneto-optical material layer 2 can be obtained as compared with the case of bonding the Si waveguide layer and the magneto-optical material layer by wafer bonding, and the optical isolator can be manufactured with high repeatability.

MODIFIED EXAMPLE

The present embodiment can be applied by being variously modified without being limited to the above described embodiment. For example, in the above described embodiment, the nonreciprocal phase shifter is designed so that the difference of the nonreciprocal phase changes in the two waveguides becomes 90° in the forward direction (−90° in the reverse direction), and the reciprocal phase shifter is designed so that the difference becomes −90°, but these signs may be opposite from each other.

Further, in the above described embodiment, as the example of an optical nonreciprocal element, the optical isolator is described, but the present embodiment is not limited to optical isolators. For example, if in the optical isolator 100 of FIG. 1, two tapering trifurcated optical couplers are replaced with directional couplers, an optical circulator using the nonreciprocal phase shift effect can be configured. The operation principle thereof is the same as the optical isolator. More specifically, in the forward direction, the nonreciprocal phase shift effect and the reciprocal phase shift effect cancel out each other, and in the reverse direction, they are added up, whereby the optical circulator operation is realized.

Further, the configuration of the optical isolator is not limited to the one shown in FIG. 1. For example, as shown in FIG. 7, the configuration of the present embodiment (the configuration of forming an Si waveguide layer on the Si layer deposited on the magneto-optical material layer) may be adopted in the optical isolator including an Si waveguide layer having a linear rib waveguide, and using a nonreciprocal waveguide mode-radiation mode conversion. The optical isolator shown in FIG. 7 includes a nonreciprocal phase device of the layer structure of Si/the magneto-optical material magnetized vertically to the light propagating direction and in the direction at a predetermined angle with respect to the film surface, and thereby, causes the TM mode light propagating in the rib waveguide to generate a nonreciprocal phase effect. When the propagation constants of the TM mode lights propagating in the forward direction and the reverse direction are expressed by $\beta_{11f}$ and $\beta_{11b}$, respectively, and the cutoff of the TE mode is expressed by $\beta c$, the optical isolator can be designed so as to satisfy the relationship of $\beta_{11b} < \beta c < \beta_{11f}$ by adjusting the waveguide parameters (the height of the rib, rib width and the like). When this relationship is satisfied, only the TM mode light propagating in the reverse direction is coupled with the TE radiation mode light, and therefore, the optical isolator can be caused to function as a TM mode operation optical isolator.

DESCRIPTION OF SYMBOLS

Figure 1:
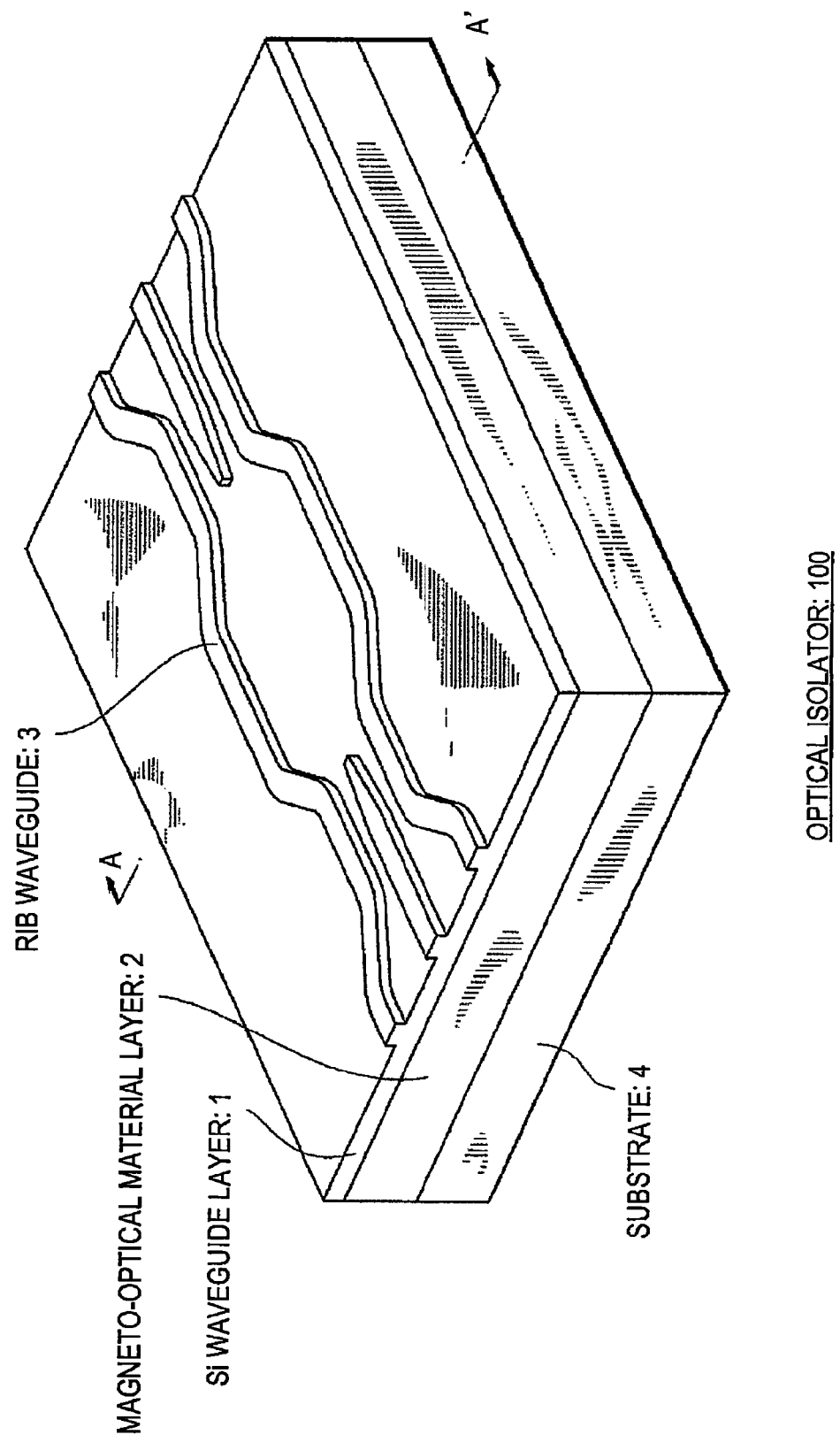
FIG. 1 is a view showing a structure of an optical isolator 100 according to the present embodiment.
Figure 2:
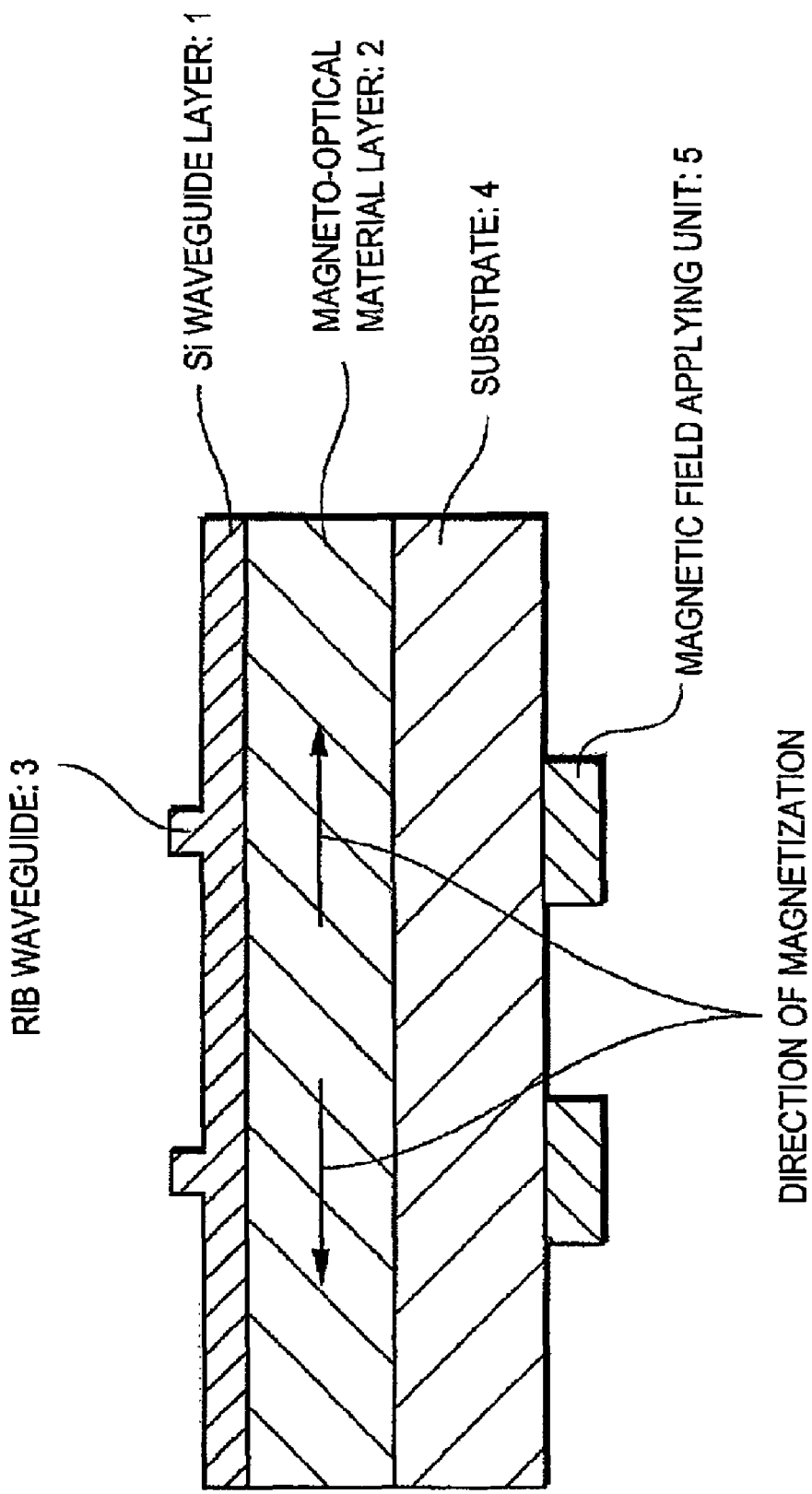
FIG. 2 is a partial sectional view of the optical isolator 100 shown in FIG. 1.
Figure 3:
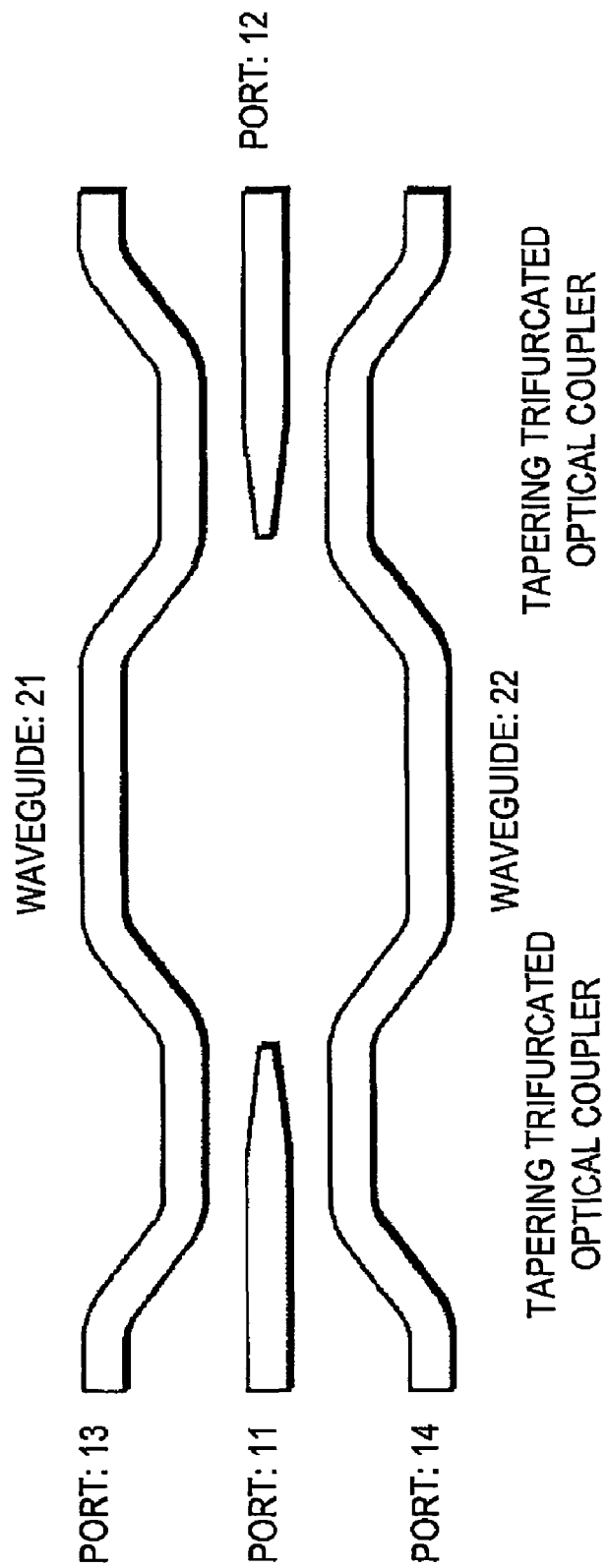
FIG. 3 is a view schematically showing a rib waveguide 3.
Figure 4A:
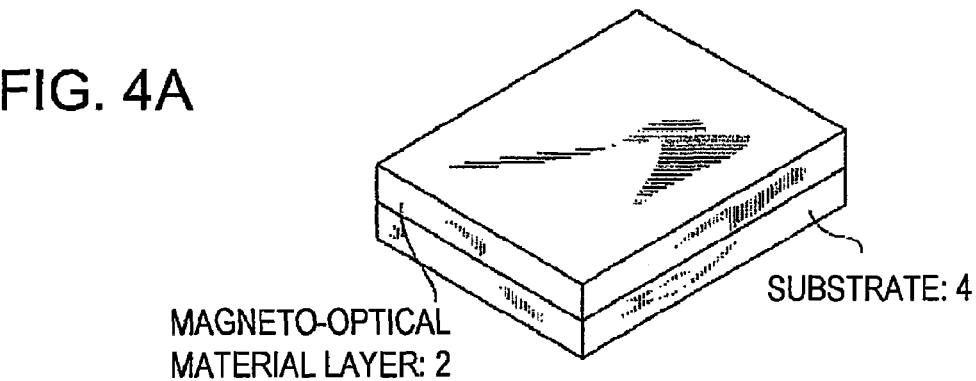
FIGS. 4A to 4D are views for explaining a manufacture process of the optical isolator 100.
Figure 4B:
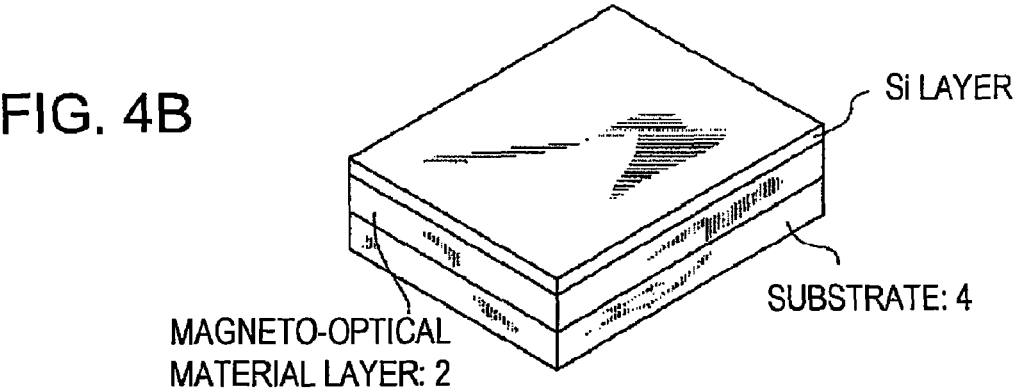
Figure 4C:
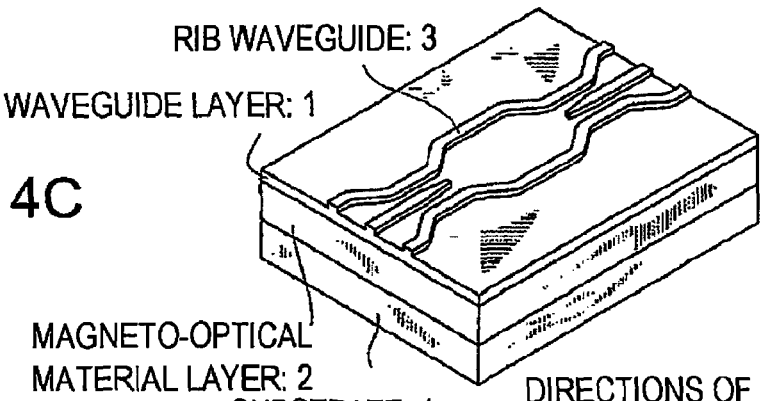
Figure 4D:
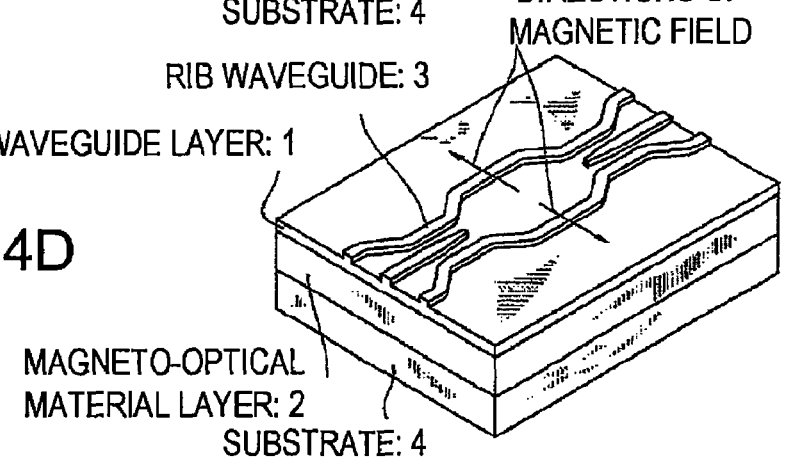
Figure 5:
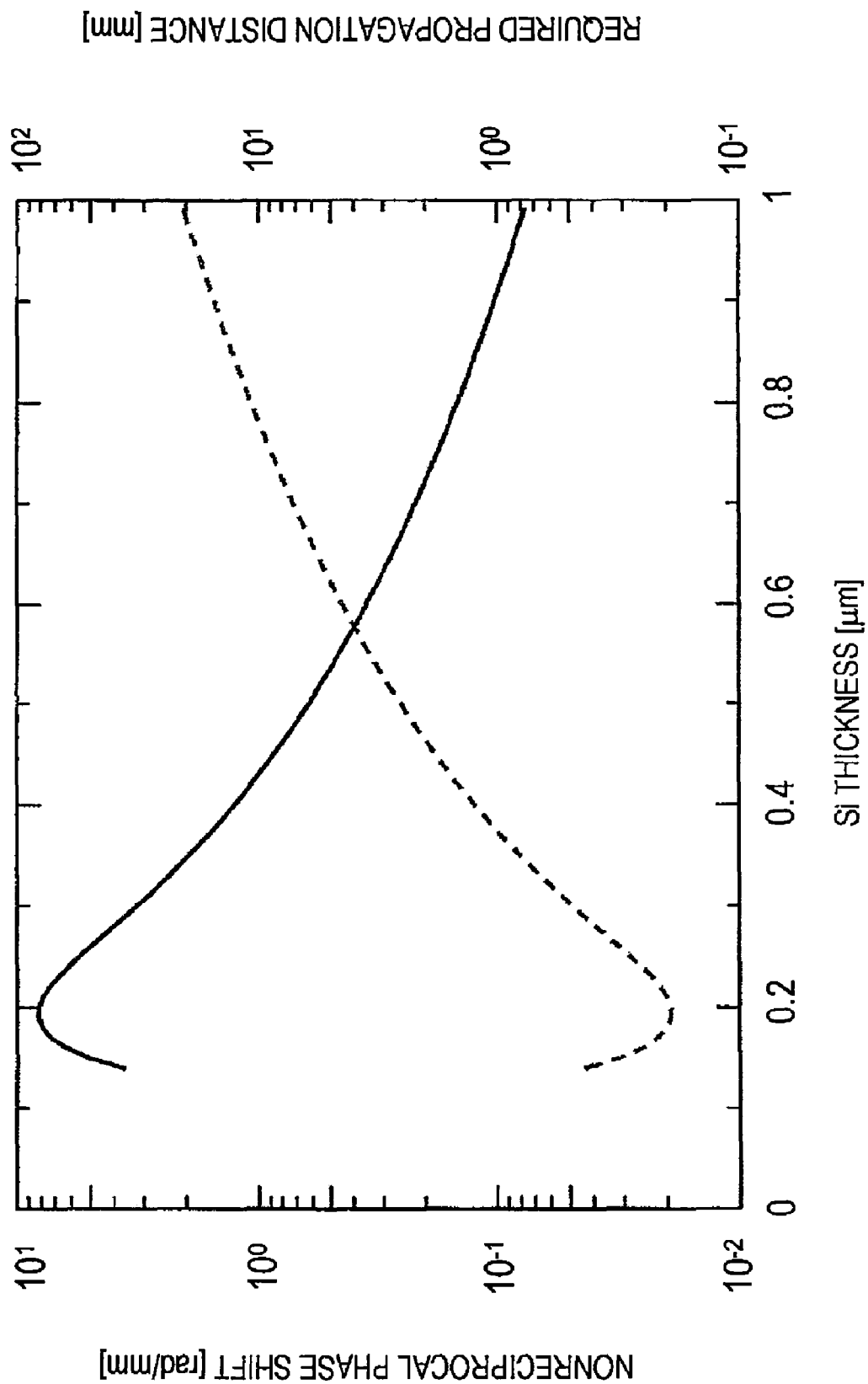
FIG. 5 is a diagram showing a nonreciprocal phase shift effect in the case of using Ce:YIG as a magneto-optical material.
Figure 6:
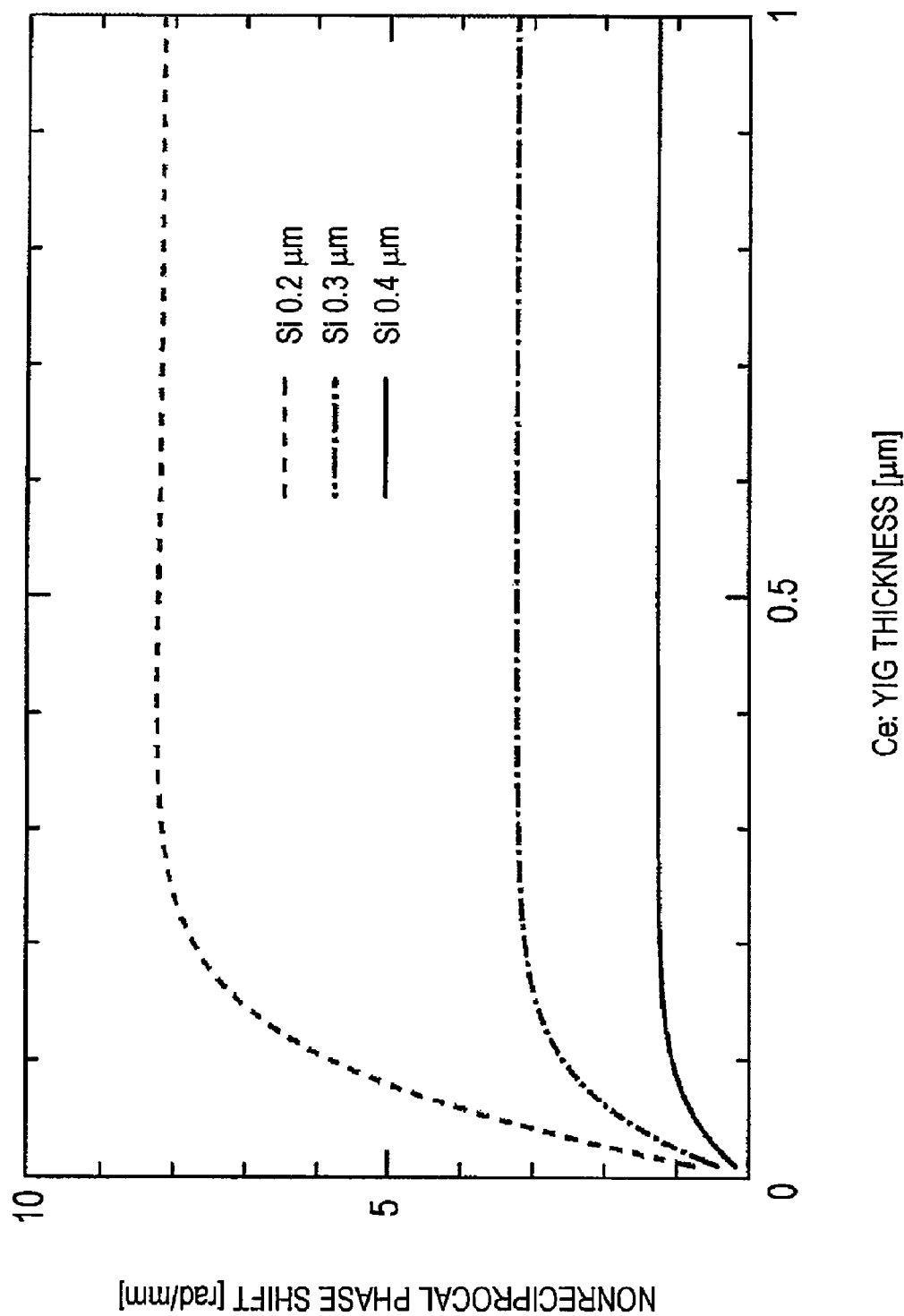
FIG. 6 is a diagram showing the relationship of a thickness of a Ce:YIG layer and an amount of a nonreciprocal phase shift effect.
Figure 7:
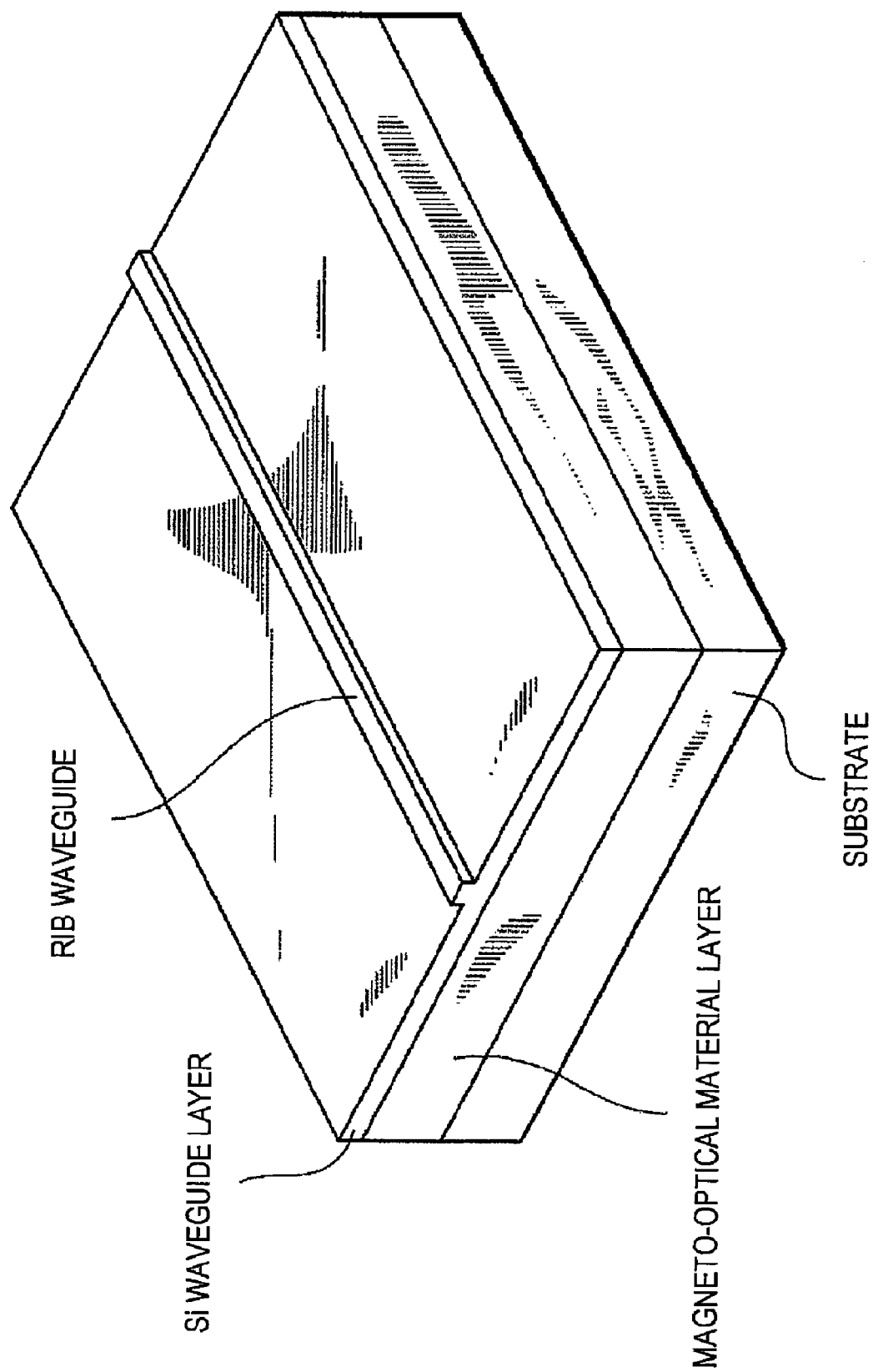
FIG. 7 is a view explaining an optical isolator of a modified example.

1 Si WAVEGUIDE LAYER; 2 MAGNETO-OPTICAL MATERIAL LAYER; 3 RIB WAVEGUIDE; 4 SUBSTRATE; 5 MAGNETIC FIELD APPLYING UNIT; 11, 12, 13, 14 PORT; 21, 22 WAVEGUIDE

The invention claimed is:

1. A method for manufacturing an optical nonreciprocal element, the method comprising:
   depositing a magneto-optical material layer on a substrate;
   depositing a silicon layer on the magneto-optical material layer;
   after the depositing the silicon layer on the magneto-optical material layer, forming a waveguide from the silicon layer; and
   magnetizing the magneto-optical material layer so as to be able to cause a light propagating in said waveguide to generate a nonreciprocal phase change.

2. The method for manufacturing an optical nonreciprocal element according to claim 1, wherein the magnetizing the magneto-optical material layer comprises magnetizing the magneto-optical material layer in a direction vertical to a propagating direction of the light in the waveguide.

3. The method for manufacturing an optical nonreciprocal element according to claim 1, wherein the magneto-optical material layer is formed by a magnetic garnet formed by growing a crystal on the substrate.

4. An optical nonreciprocal element comprising:
   a silicon waveguide layer;
   a waveguide formed on the silicon waveguide layer; and
   a magneto-optical material layer in contact with a surface of the silicon waveguide layer at a side opposite from a surface on which the waveguide is formed,
   wherein the silicon waveguide layer is obtained by forming a waveguide on a silicon layer deposited on the magneto-optical material layer, and
   wherein the magneto-optical material layer is magnetized so as to cause a light propagating in the waveguide to generate a nonreciprocal phase change.

* * * * *

UNITED STATES PATENT AND TRADEMARK OFFICE
CERTIFICATE OF CORRECTION

| | |
|---|---|
| PATENT NO. | : 8,306,371 B2 |
| APPLICATION NO. | : 12/665435 |
| DATED | : November 6, 2012 |
| INVENTOR(S) | : Yokoi |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 199 days.

Signed and Sealed this
Fifth Day of March, 2013

Teresa Stanek Rea
*Acting Director of the United States Patent and Trademark Office*